(12) United States Patent
Affre De Saint Rome (10) Patent No.: US 8,991,754 B2
(45) Date of Patent: *Mar. 31, 2015

(54) ANCHORING HARPOON INTENDED IN PARTICULAR FOR AN AIRCRAFT AND ANCHORING SYSTEM INCLUDING ONE SUCH HARPOON

(75) Inventor: Ronan Affre De Saint Rome, Carantec (FR)

(73) Assignee: DCNS, Paris (FR)

( * ) Notice: Subject to any disclaimer, the term of this patent is extended or adjusted under 35 U.S.C. 154(b) by 100 days.

This patent is subject to a terminal disclaimer.

(21) Appl. No.: 13/262,379

(22) PCT Filed: Jan. 11, 2010

(86) PCT No.: PCT/FR2010/050030
§ 371 (c)(1),
(2), (4) Date: Dec. 28, 2011

(87) PCT Pub. No.: WO2010/112716
PCT Pub. Date: Oct. 7, 2010

(65) Prior Publication Data
US 2012/0112003 A1 May 10, 2012

(30) Foreign Application Priority Data
Apr. 3, 2009 (FR) .................................. 09 52183

(51) Int. Cl.
*B64F 1/12* (2006.01)
*B64F 1/16* (2006.01)
*F16B 21/16* (2006.01)

(52) U.S. Cl.
CPC .. *B64F 1/16* (2013.01); *F16B 21/16* (2013.01)
USPC .................... 244/115; 244/114 R; 244/1 R (58) Field of Classification Search
USPC .............. 244/114 R, 115, 1 R; 411/347, 378; 114/206, 294; 52/153, 161, 160, 156; 248/156, 160, 161, 188.8; 294/192, 294/195
See application file for complete search history.

(56) References Cited

U.S. PATENT DOCUMENTS 1,796,147 A * 3/1931 Green et al. ................ 52/161
2,403,456 A 7/1946 Pitcairn
(Continued)

FOREIGN PATENT DOCUMENTS

EP 547275 A1 * 6/1993 .............. B64F 1/12
EP 1 767 453 A1 3/2007
(Continued)

*Primary Examiner* — Tien Dinh
*Assistant Examiner* — Assres H Woldemaryam
(74) *Attorney, Agent, or Firm* — McDermott Will & Emery LLP (57) ABSTRACT

The invention relates to an anchoring harpoon intended in particular for an aircraft, capable of cooperating with an anchoring grate (2) of a platform, comprising jack means (3) including cylinder means (4) containing mobile piston means (5) provided with a rod (6) that extends beyond the cylinder means, the free end of which includes a harpoon head (7) that is hooked in the grate (2) and comprises retaining fingers (8, 13, 14) that can be moved between a retracted position and an active position by control means (9). The invention is characterised in that the cylinder means (4) include at least two telescopic cylinder portions (10, 11) which can move between a position in which one portion is retracted inside the other and an active position in which one portion projects out from the other.

12 Claims, 5 Drawing Sheets

(56) References Cited

U.S. PATENT DOCUMENTS

| | | | |
|---|---|---|---|
| 3,054,123 A * | 9/1962 | Moeller | 441/25 |
| 3,154,042 A * | 10/1964 | Thomason et al. | 114/295 |
| 3,430,305 A * | 3/1969 | Geffner | 24/603 |
| 3,502,286 A * | 3/1970 | Warren | 244/17.17 |
| 3,577,949 A * | 5/1971 | Mueller et al. | 114/295 |
| 3,653,139 A * | 4/1972 | Temple et al. | 42/106 |
| 4,275,680 A * | 6/1981 | Pennington et al. | 114/295 |
| 4,381,092 A * | 4/1983 | Barker | 244/172.4 |
| 5,080,304 A * | 1/1992 | Stump et al. | 244/115 |
| 5,209,431 A * | 5/1993 | Bernard et al. | 244/17.17 |
| 5,480,108 A * | 1/1996 | Amiand et al. | 244/115 |
| 5,971,072 A * | 10/1999 | Huber et al. | 166/297 |
| 6,176,519 B1 * | 1/2001 | Limingoja | 280/762 |
| 7,104,505 B2 * | 9/2006 | Tchoryk et al. | 244/172.4 |
| 7,275,889 B1 * | 10/2007 | McGill | 404/6 |
| 2008/0003077 A1 * | 1/2008 | Anderson | 411/347 |
| 2011/0233332 A1 * | 9/2011 | Proutiere | 244/115 |

FOREIGN PATENT DOCUMENTS

| | | | |
|---|---|---|---|
| FR | 2 701 689 | 8/1994 | |
| JP | 49-27777 A | 3/1974 | |
| WO | WO 9013480 A1 * | 11/1990 | B64F 1/12 |
| WO | WO 91/04910 | 4/1991 | |

\* cited by examiner

ANCHORING HARPOON INTENDED IN PARTICULAR FOR AN AIRCRAFT AND ANCHORING SYSTEM INCLUDING ONE SUCH HARPOON

RELATED APPLICATIONS

This application is the U.S. National Phase under 35 U.S.C. §371 of International Application No. PCT/FR2010/050030, filed on Jan. 11, 2010, which in turn claims the benefit of French Application No. 09 52183, filed on Apr. 3, 2009, the disclosures of which Applications are incorporated by reference herein.

The present invention relates to an anchoring harpoon intended in particular for an aircraft, capable of cooperating with an anchoring grate of a platform, and an anchoring system including one such harpoon.

Such harpoons and anchoring systems are already generally known from the state of the art.

Thus for example, document FR-A-2 701 689 describes a harpoon intended to equip a rotary-wing aircraft, such as a helicopter, for example, and that can be pulled toward a decking platform of a vessel so that the harpoon head becomes fixed on the grate and thereby forms an anchoring point of the aircraft, in particular facilitating the decking operation thereof.

The anchoring harpoon described in this document has cylinder means in which piston means move that are provided with a rod that extends beyond the cylinder means and the free end of which includes a harpoon head that is attached in the grate. This harpoon head is in fact provided with retaining fingers in the grate that can be radially moved between a retracted position and an active position by control means.

Such harpoons have already been successfully implemented on many vessels to ensure the anchoring for example of helicopter-type aircrafts.

For some time, we have also seen a large number of attempts for the embarkation of rotary-wing aircrafts of the drone type on platforms, in particular military ones.

The applicant has also developed and successfully tested an automatic decking and take-off system for a rotary-wing drone on and from one such vessel.

The implementation of these drones also requires the use of anchoring harpoons and grates.

Studies have shown that the adaptation of the already-known anchoring harpoons for helicopters directly on rotary-wing drones has not been successfully contemplated.

In fact, these studies have shown problems of size, power, maintenance, etc.

The aim of the invention is to resolve these problems.

To that end, the invention relates to an anchoring harpoon intended in particular for an aircraft, capable of cooperating with an anchoring grate of a platform, comprising jack means including cylinder means containing mobile piston means provided with a rod that extends beyond the cylinder means, the free end of which includes a harpoon head that is hooked in the grate and comprises retaining fingers that can be moved between a retracted position and an active position by control means, characterized in that the cylinder means include at least two telescopic cylinder portions which can move between a position in which one portion is retracted inside the other and an active position in which one portion projects out from the other.

According to other features of the invention, considered separately or in combination:

the jack means are connected to a pressurized fluid source through control means and in that said pressurized fluid source has a consumable gas cartridge, the gas is $CO_2$, the control means comprise means forming a solenoid valve steered upon opening and closing to supply the jack means, the means for controlling the movements of the fingers comprise a control piston slidingly movable in the rod of the cylinder and associated with a bistable actuator of the fingers, movable between retracted and active, extended positions of the fingers through successive applications of pressure pulses in the jack means, the bistable actuator is a mechanical twist lock, the bistable actuator has a beveled toothed wheel inserted between the control piston and an actuating rod of the fingers, arranged in a sleeve connected to the rod of the jack, the end of the piston opposite the beveled toothed wheel having teeth in turn so as, when pressure pulses are applied in the jack means and movements of the control piston therefore occur, to turn the beveled toothed wheel in the sleeve, the teeth of the wheel also being adapted to cooperate with consecutive notches of different heights in the sleeve, so as to define stable, active and retracted positions, of the actuating rod of the fingers, it has a spring stressing the actuating rod of the fingers in the retracted position, the corresponding end of the jack means is associated with the aircraft and in that a helical return and pressure spring is inserted between said end of the jack and the harpoon head, the helical spring is arranged around jack means, it includes trigger means prohibiting the movement of the fingers toward their active position as long as the harpoon head is not in the stop position in the anchoring grate.

The invention also relates to an anchoring system in particular for a rotary-wing drone-type aircraft that comprises an anchoring harpoon as previously described.

The invention will be better understood using the following description, provided solely as an example, and done in reference to the appended drawings, in which.

Figure 1:
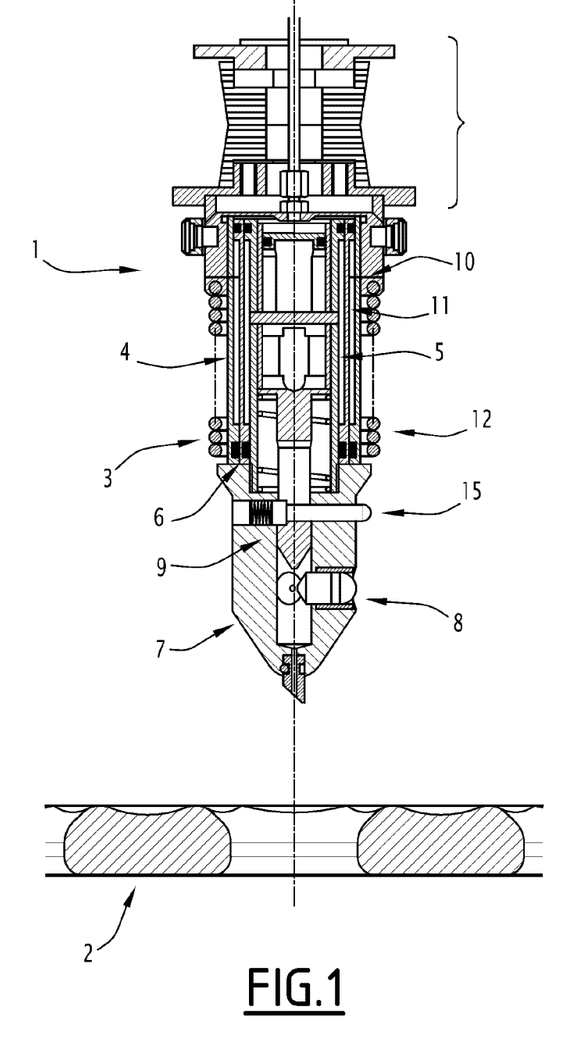
FIGS. 1 and 2 show cross-sectional views of an anchoring harpoon according to the invention in retracted and active anchoring positions, respectively, in an anchoring grate of a platform.
Figure 2:
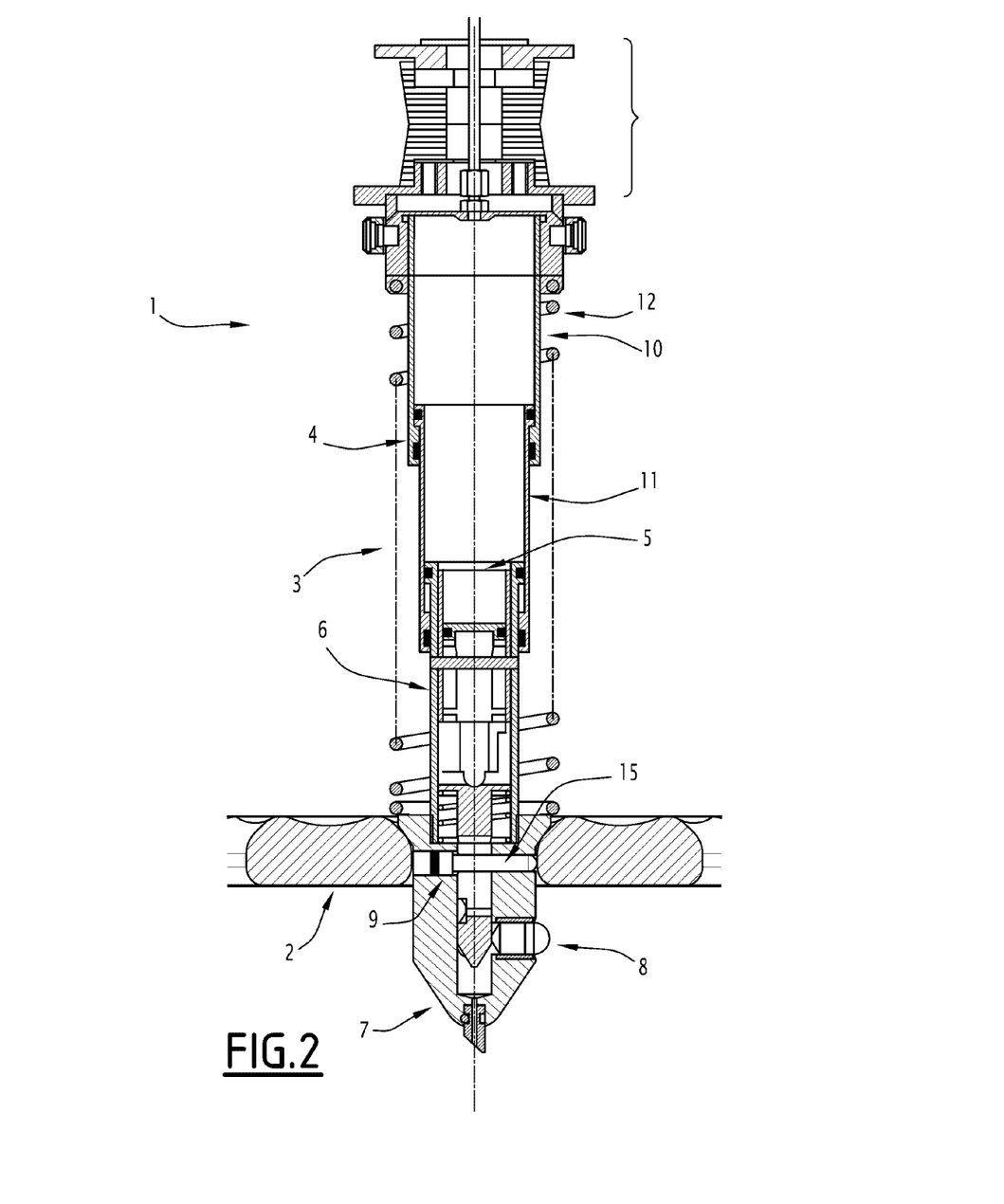

These figures, and in particular FIGS. 1 and 2, illustrate an anchoring harpoon intended in particular for anchoring an aircraft on platform such as a military vessel or other.

The aircraft can for example be a rotary-wing drone.

This harpoon is designated by general reference 1 in these figures and is adapted to cooperate with an anchoring grate of the platform, this grate being designated by general reference 2 in these figures.

In fact, the harpoon has jack means designated by general reference 3, comprising cylinder means designated by general reference 4, in which the piston means, designated by general reference 5, move.

These piston means are provided with a rod 6 extending beyond the cylinder means and the free end of which has an attachment harpoon head in the grate, this harpoon head being designated by general reference 7.

In fact and as described in the aforementioned prior art document, this harpoon head is provided with retaining fingers in the grate, radially movable between a retracted position and an active position by control means, as will be described in more detail below.

In these figures, one of the fingers is designated by general reference 8 and the control means thereof by general reference 9.

Figure 3:
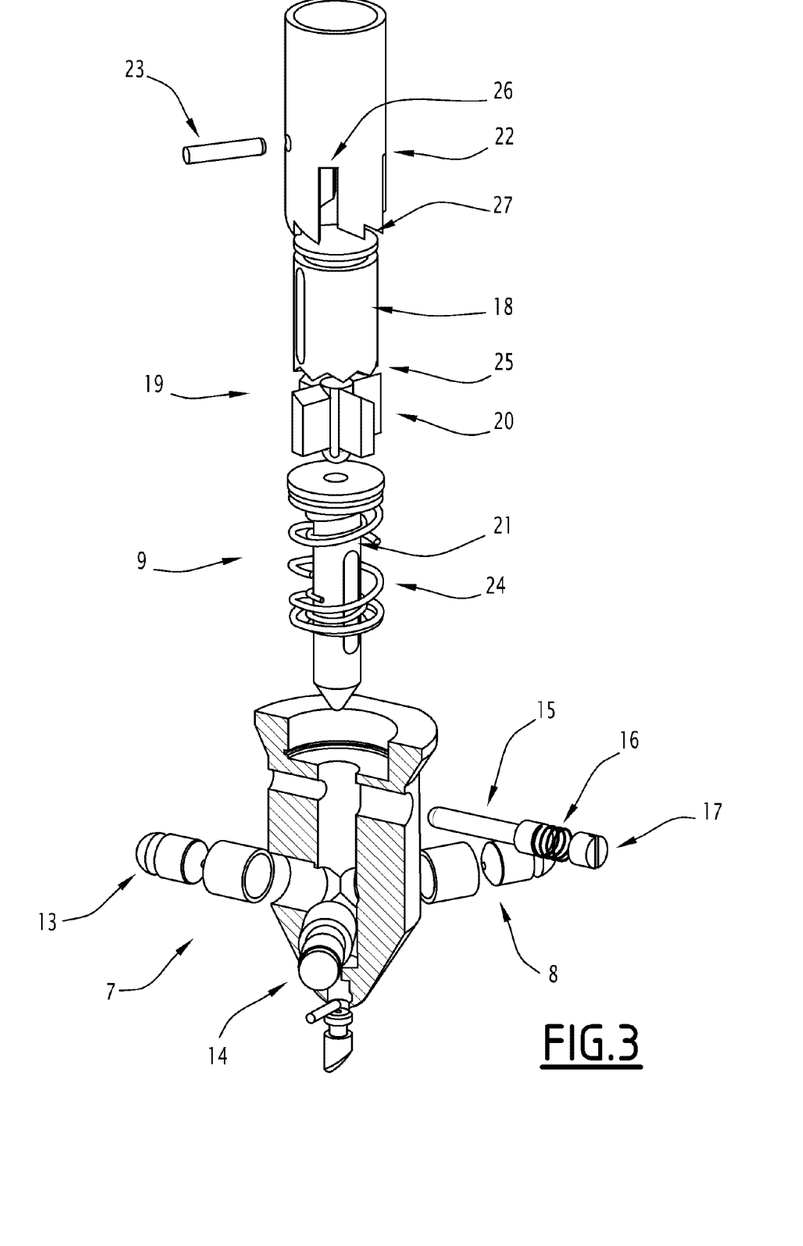
FIG. 3 shows an exploded perspective view of an attachment harpoon head included in the composition of a harpoon according to the invention.

The structure of these control means will also be described in more detail in light of FIG. 3.

If we return to FIGS. 1 and 2, we see that the fingers and the control means are shown in the retracted position in FIG. 1 and in the active position in FIG. 2, when the harpoon is deployed, the control means being moved in the rod to cause a radial movement of the retaining fingers between the retracted position, in FIG. 1, in the harpoon head and the active retaining position, in FIG. 2, radially protruding relative to said head to lock it in said grate.

To resolve the various problems of incorporating a drone in particular as previously described, in the anchoring harpoon according to the invention, the cylinder means of the jack have at least two telescopic cylinder portions which can move between a position in which one portion is retracted inside the other and an active anchoring position in which one portion projects out from the other, as illustrated in said FIGS. 1 and 2, respectively.

In these figures, the two telescopic cylinder portions are respectively designated by references 10 and 11.

The upper cylinder portion 10 is then associated with attachment means on the drone, these means having any suitable traditional structure, while the other end of said upper cylinder portion 10 is adapted to receive the lower cylinder portion 11, which in turn supports the rod 6 whereof the free end supports the harpoon head 7.

The cylinder means are then connected to a pressurized fluid source through control means to control their operation, i.e. the deployment of the anchoring harpoon and its attachment or separation relative to the anchoring grate.

To that end, a helical return and pressure spring 12 is inserted between the end of the upper cylinder portion associated with the aircraft and the harpoon head to ensure, as illustrated in FIG. 2 and when the harpoon head is anchored in the grate, correct pressing of the drone on the platform.

The harpoon head 7 can be similar to that which has already been described in the aforementioned document and can for example have three retaining fingers arranged at 120° from each other and for example designated by general references 8, 13 and 14 in FIG. 3. These fingers can then be moved between a retracted position and an active position projecting radially out from the rest of the head so as to anchor the harpoon in the grate under the control of the control means, designated by general reference 9 in FIGS. 1, 2 and 3.

Also traditionally, the harpoon head 7 can have an arming trigger of these control means 9 to prohibit the fingers from moving to their active position as long as the harpoon head is not in the stop position in the anchoring grid, i.e. in the correct anchoring position in the grate.

This trigger has also previously been described and is designated by general reference 15 in this FIG. 3.

This trigger 15 is then arranged transversely in the harpoon head 7, protrudes radially from said head and is associated with a spring 16 and a stop member 17 to be pushed back in the harpoon head when the latter is in the correct position in the anchoring grate, as illustrated in FIG. 2, and to allow the movement of the control means 9 and the retaining fingers.

The control means 9 comprise a piston designated by general reference 18 that can be slidingly moved in the rod of the jack and associated with a bistable actuator of the fingers, which can be moved between retracted and active, extended positions of the fingers through consecutive applications of pressure pulses in the jack means.

This bistable actuator of the fingers is designated by general reference 19 and has several pieces forming what is commonly called a twist lock.

This bistable actuator in fact has a beveled toothed wheel designated by general reference 20 in FIG. 3, inserted between the control piston 18 and an actuating rod of the fingers designated by general reference 21 in said FIG. 3.

The piston 18 and the beveled toothed wheel 20 are arranged in a sleeve designated by general reference 22 connected to the rod 6 of the jack, for example via a pin designated by general reference 23.

A spring stressing the actuating rod 21 of the fingers in the retracted position is also provided, said spring being designated by general reference 24 in said FIG. 3.

The end of the piston 18 opposite the beveled toothed wheel in turn has teeth such as the tooth designated by general reference 25 in that figure, so as, when pressure pulses are applied in the jack means and therefore corresponding movements of the piston 18 occur, to turn the beveled toothed wheel 20 in the sleeve 22. The beveled teeth of the wheel 20 are also adapted to cooperate with consecutive notches of different heights of the sleeve 22 so as to define stable, active and retracted positions of the actuating rod 21 of the fingers, and therefore of said fingers.

Two consecutive notches of different heights of the sleeve are for example designated by general references 26 and 27 in that figure.

In the retracted position of the control means 9, the teeth of the wheel 20 for example bear against the notches such as the notch 26. When pressure is applied in the jack means, the piston 18 causes the toothed wheel 20 and the actuating rod 21 to move against the elastic stress of the spring 24 if the trigger 15 is armed, i.e. pushed back, the head being in the correct position in the grate.

Upon this thrust, the teeth 25 of the piston 18 also tend to turn the toothed wheel. However, this rotational movement of the wheel is prevented by the cooperation of the teeth of the wheel with the edges of the sleeve 22 on each side of the notch 26 until the moment when the beveled teeth of the wheel 20 can cross the corresponding end of the sleeve 22 to cooperate with the notch 27 for maintaining the teeth and therefore the actuating rod 21 in the active, extended position of the fingers of the attachment head.

The locking in position is then ensured by stressing the spring 24, which pushes the actuating rod 21 and the toothed wheel 20 to remain in position against the notch 27.

The fluid pressure can then be released in the jack means while preserving the anchoring of the aircraft in the grate.

A new application of a fluid pressure pulse in the jack means causes a new angular movement of the beveled toothed wheel opposite the following notch corresponding to the retracted position of the actuating means under the action of the spring 24 in order to unlock the head.

It of course goes without saying that other embodiments of this bistable actuator controlled by consecutive pressure pulse applications in the jack means, can be contemplated.

One can thus see that the use of such a bistable mechanical lock makes it possible to use only pressure pulses in the jack means and no longer requires that the pressure be maintained therein as was the case with the jack means of the prior art.

A single pressure pulse in fact makes it possible to extend the fingers and a single additional pressure pulse makes it possible to retract them.

Furthermore, it also makes it possible to modify the pressurized fluid supply means of the jack means.

Figure 4:
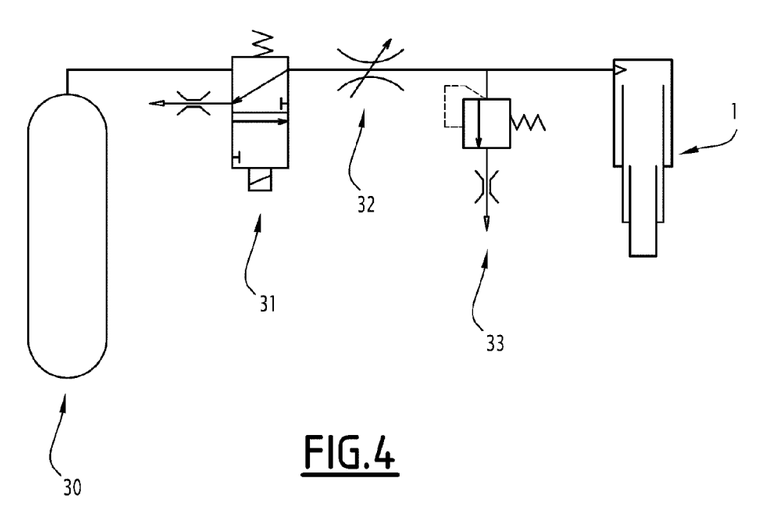
FIG. 4 shows a summary diagram illustrating the pressurized fluid supply of a harpoon according to the invention.

A summary diagram of these supply means is provided in FIG. 4.

In fact, the supply means can have a pressurized fluid source that for example assumes the form of a consumable gas cartridge such as, for example, a consumable $CO_2$ cartridge, designated by general reference 30 in that figure.

This gas cartridge 30 is then connected as input to the solenoid valve means 3/2 that is normally closed, designated by general reference 31, which in turn is connected to adjustable restriction means making it possible to limit the flow of gas during harpooning and bleeding, designated by general reference 32.

A safety valve adjusted to a pressure slightly greater than the desired harpoon pressure is also provided, said valve being designated by general reference 33, the harpoon still being designated by general reference 1.

The opening and closing control of the solenoid valve means then makes it possible to steer the jack means in the form of pressure pulses.

Figure 5:
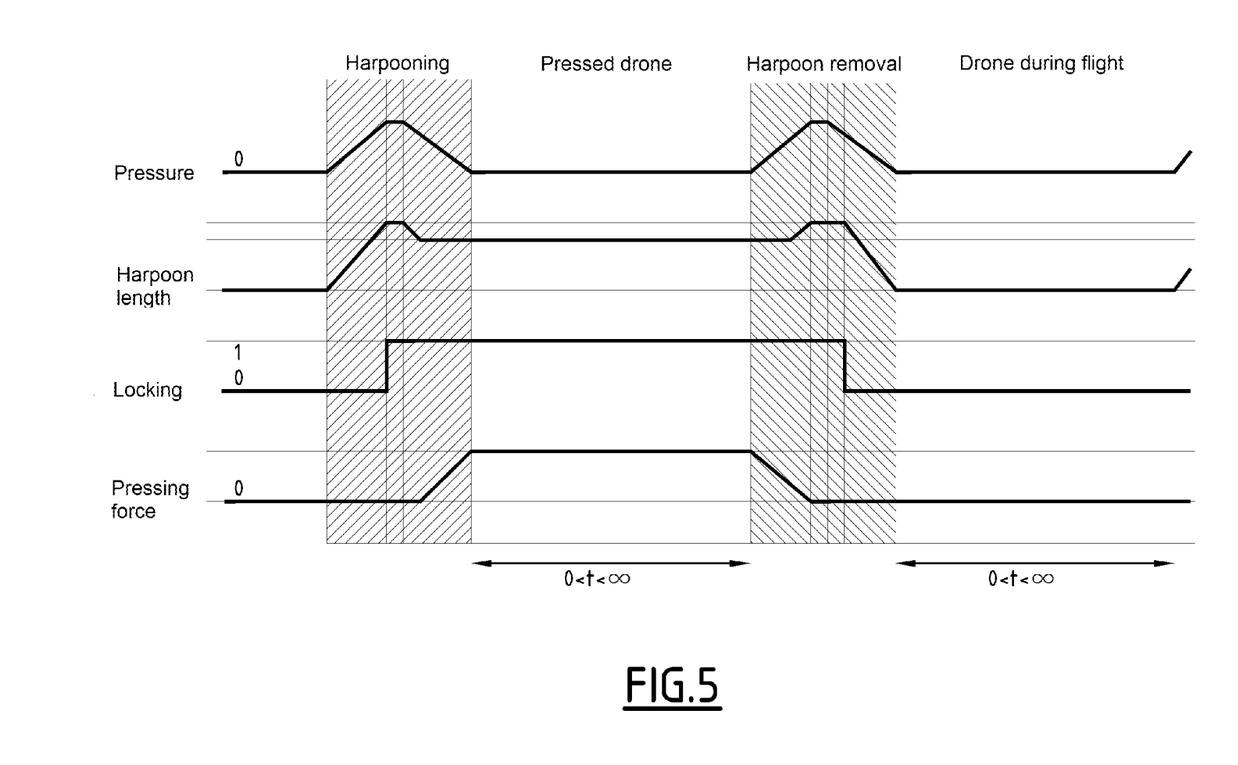
FIG. 5 illustrates the operation of such a harpoon.

This pulse operation is illustrated in FIG. 5, which shows that the harpooning and harpoon removal are done through successive pressure pulse applications in the jack means, which makes it possible on the one hand to deploy the telescoping harpoon, which stays in the deployed position as long as the anchoring head is locked in the grate and which also makes it possible to obtain a force pressing the aircraft on the platform.

One can also see that the application of a pressure pulse by controlling the opening of the solenoid valve means 31 previously described allows the cylinder portions of the jack means to deploy, so as to cause the attachment head of the harpoon to penetrate the grate.

The harpoon head is then housed in a cell of the grate, which makes it possible to push back the arming trigger 15 and therefore the piston 18, under the action of the fluid pressure in the jack means, to push the actuating rod 21 of the fingers 8 toward the output position of these fingers in order to lock the head in the grate.

The bistable mechanical twist lock makes it possible to lock the rod and the fingers in this active anchoring position of the head in the grate and the fluid pressure can then be released in the jack means, the helical return and pressure spring 12 making it possible to keep the drone pressed in position on the grate.

Upon application of a new pressure pulse in the jack means, the piston 18 turns the beveled toothed wheel 20 to unlock the mechanical twist lock, which allows, upon release of the fluid pressure in the jack means, the spring 24 to push the actuating rod 21 of the fingers toward a retracted position, and allows them to return to a retracted position in the anchoring head, which releases said anchoring head of the grate and makes it possible, via the helical spring 12, to return the jack means to a retracted position (FIG. 1).

One can then see that such a structure has a certain number of advantages relative to the prior art harpoons.

The use of a telescoping jack in fact makes it possible to double the deployment travel of the harpoon for a same folded length and therefore to considerably decrease the length of the harpoon in the folded position, which makes it possible to adapt to the bulk constraints related to the onboard embarkation of a drone.

The use of a pressure and return spring placed outside the jack means also makes it possible to obtain a correct pressing force against the grate.

The use of a bistable actuator with a mechanical twist lock makes it possible to keep the harpoon in its position between two state change pulse orders, i.e. folded or locked in the grate.

The transition from one state to the other is done by applying a pressurized fluid pulse in the jack means. This then makes it possible to use a consumable cartridge, for example gas, associated with control means for a solenoid valve to ensure the supply.

Of course, different embodiments of the described pieces can be contemplated and other applications can also be contemplated, for example for anchoring aircrafts on oil or other platforms.

The invention claimed is:

1. An anchoring harpoon intended in particular for an aircraft, capable of cooperating with an anchoring grate of a platform, comprising;
    a jack including a cylinder containing a mobile piston supporting a rod that extends beyond the cylinder, the free end of the rod includes a harpoon head configured to be hooked in the grate and the harpoon head comprises retaining fingers that can be moved between a retracted position and an active position by a controller,
    wherein the cylinder of the jack includes at least two different telescopic cylinder portions, a lower portion in which the mobile piston is installed and moves and an upper portion, which can move between:
    a passive position in which the lower portion is retracted inside the upper portion such that the harpoon is folded and occupies a minimum amount of space; and
    an active position in which the lower portion projects out from the upper portion, corresponding to an anchoring configuration of the harpoon head in which the harpoon head is to be anchored in the grate, and
    wherein the jack is configured to keep the cylinder portions in their passive position by default, and to move the telescopic portions from their passive position to their active position to deploy the harpoon head relative to the upper portion of the cylinder for anchoring the harpoon head in the grate.

2. The anchoring harpoon according to claim 1, wherein the jack is connected to a pressurized fluid source through a fluid controller and in that said pressurized fluid source has a consumable gas cartridge.

3. The anchoring harpoon according to claim 2, wherein the gas is $CO_2$.

4. The anchoring harpoon according to claim 2 wherein the fluid controller comprises a solenoid valve steered upon opening and closing to supply the cylinder.

5. The anchoring harpoon according to claim 1, wherein the controller controlling the movements of the fingers comprise a control piston slidingly movable in the rod of the cylinder and associated with a bistable actuator of the fingers, movable between retracted and active, extended positions of the fingers through successive applications of pressure pulses in the jack.

6. The anchoring harpoon according to claim 5, wherein the bistable actuator is a mechanical twist lock.

7. The anchoring harpoon according to claim 6, wherein the bistable actuator comprises a beveled toothed wheel inserted between the control piston and an actuating rod of the fingers, arranged in a sleeve connected to the rod of the jack, the end of the piston opposite the beveled toothed wheel having teeth in turn so as, when pressure pulses are applied in the jack and movements of the control piston therefore occur, to turn the beveled toothed wheel in the sleeve, the teeth of the wheel cooperate with consecutive notches of different heights in the sleeve, so as to define stable, active and retracted positions, of the actuating rod of the fingers.

8. The anchoring harpoon according to claim 7, wherein the harpoon has a spring stressing the actuating rod of the fingers in the retracted position.

9. The anchoring harpoon according to claim 1, wherein the corresponding end of the jack is associated with the aircraft and in that a helical return and pressure spring is inserted between said end of the jack and the harpoon head.

10. The anchoring harpoon according to claim 9, wherein the helical spring is arranged around the jack.

11. The anchoring harpoon according to claim 1 wherein the harpoon includes a trigger prohibiting the movement of the fingers toward their active position as long as the harpoon head is not in the stop position in the anchoring grate.

12. An anchoring system in particular for a rotary-wing drone-type aircraft, wherein the anchoring system comprises an anchoring harpoon according to claim 1.

* * * * *